(12) United States Patent
Peng et al.

(10) Patent No.: US 8,329,358 B2
(45) Date of Patent: Dec. 11, 2012

(54) BIPOLAR PLATE FOR FUEL CELL AND FUEL CELL HAVING THE SAME

(75) Inventors: Jie Peng, Yongin-si (KR); Seung-jae Lee, Seongnam-si (KR); Tae-won Song, Seoul (KR); Jae-young Shin, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1623 days.

(21) Appl. No.: 11/513,254

(22) Filed: Aug. 31, 2006

(65) Prior Publication Data

US 2007/0178359 A1    Aug. 2, 2007

(30) Foreign Application Priority Data

Jan. 27, 2006  (KR) .................. 10-2006-0009008

(51) Int. Cl.
*H01M 8/04* (2006.01)
*H01M 4/64* (2006.01)

(52) U.S. Cl. ....................... 429/514; 429/518

(58) Field of Classification Search .................. 428/167; 429/12–46, 514, 518
See application file for complete search history.

(56) References Cited

U.S. PATENT DOCUMENTS

| 6,699,614 | B2 | 3/2004 | Rock | |
|---|---|---|---|---|
| 6,884,536 | B1* | 4/2005 | Hatoh et al. | 429/34 |
| 2003/0175577 | A1 | 9/2003 | Rock | |
| 2004/0151973 | A1 | 8/2004 | Rock | |
| 2004/0197633 | A1 | 10/2004 | Yamamoto et al. | |
| 2005/0069749 | A1* | 3/2005 | Frank et al. | 429/38 |
| 2005/0074652 | A1* | 4/2005 | Choi | 429/32 |
| 2005/0084725 | A1* | 4/2005 | Arthur et al. | 429/32 |

FOREIGN PATENT DOCUMENTS

| CN | 1459883 | 12/2003 |
|---|---|---|
| CN | 1692515 A | 11/2005 |
| JP | 1-320772 | 12/1989 |
| JP | 06-290795 | 10/1994 |
| JP | 2000-195529 | 7/2000 |
| JP | 2001-325971 | 11/2001 |
| JP | 2004-207160 | 7/2004 |
| JP | 2004-241141 | 8/2004 |

(Continued)

OTHER PUBLICATIONS

Kumar, A. et al., Effect of channel dimensions and shape in the flow-field distributor on the performance of polymer electrolyte membrane fuel cells, Jan. 2003, J. Power Sources, vol. 113, pp. 11-18.*

(Continued)

*Primary Examiner* — Basia Ridley
*Assistant Examiner* — Jonathan G Leong
(74) *Attorney, Agent, or Firm* — Lee & Morse, P.C.

(57) ABSTRACT

A bipolar plate includes a plurality of flow channels for fuel flow, wherein the flow channels are divided into a plurality of sections along a direction of the fuel flow. The total cross-sectional area of the flow channels across the sections becomes smaller from a fuel inlet toward a fuel outlet. A plurality of protrusions are formed between the sections, and the protrusions mix a fuel that passes through the flow channels. A fuel cell includes membrane electrode assemblies interposed between a plurality of the bipolar plates.

17 Claims, 8 Drawing Sheets

FOREIGN PATENT DOCUMENTS

JP    2005-521219       7/2005
WO    WO 2005/057707 A1   6/2005

OTHER PUBLICATIONS

Li et al., Review of bipolar plates in PEM fuel cells: Flow-field designs, Nov. 2004, International Journal of Hydrogen Energy, vol. 30, pp. 359-371.*

Ren et al., Recent advances in direct methanol fuel cells at Los Alamos National Laboratory, Mar. 2000, Journal of Power Sources, vol. 86, pp. 111-116.*

Office Action issued by Chinese Patent Office in Chinese Patent Application No. 2006101215595 on Jul. 4, 2008.

Chinese Patent Office, Chinese Letter Patent issued in Chinese Application 200610121559.5 on Sep. 2, 2009.

* cited by examiner

BIPOLAR PLATE FOR FUEL CELL AND FUEL CELL HAVING THE SAME

CROSS-REFERENCE TO RELATED APPLICATION

This application claims the benefit of Korean Patent Application No. 2006-9008, filed on Jan. 27, 2006, in the Korean Intellectual Property Office, the disclosure of which is incorporated herein in its entirety by reference.

BACKGROUND OF THE INVENTION

1. Field of the Invention

Aspects of the present invention relate to a structure of a bipolar plate used for a fuel cell.

2. Description of the Related Art

A fuel cell is an electrical generation system that transforms chemical energy directly into electrical energy through a chemical reaction between hydrogen that is contained in a hydrocarbon group material, such as methanol, ethanol, or natural gas, and oxygen.

A proton exchange membrane fuel cell (PEMFC) has advantages of superior output, low operating temperature, rapid starting, and speedy response time compared to other fuel cells, and is the preferred fuel cell for automotive, portable, residential and small commercial applications. An example of a proton exchange membrane fuel cell is a direct liquid feed fuel cell.

FIG. 1 is a cross-sectional view of a basic configuration of a conventional PEMFC, specifically, a direct liquid feed fuel cell. As depicted in FIG. 1, a conventional PEMFC has a structure that includes an anode electrode 2, a cathode electrode 3, and an electrolyte membrane 1 interposed between the two electrodes 2 and 3. The anode electrode 2 and the cathode electrode 3 respectively include diffusion layers 22 and 32 that supply and diffuse a fuel, catalyst layers 21 and 31 at which oxidation and reduction reactions of the fuel occur, and electrode supporting layers 23 and 33. A theoretical voltage output from a unit cell of a direct methanol fuel cell (DMFC) is approximately 1.2 V. However, an open circuit voltage at ambient temperature and atmospheric pressure falls below 1 V due to a voltage drop caused by an active surcharge and a resistance surcharge. In practice, an actual operating voltage of the unit cell lies in the range of 0.4~0.7 V. Therefore, to obtain higher voltages, a plurality of unit cells connected in series is required.

A fuel cell stack is formed by stacking a plurality of unit fuel cells that are electrically connected in series with each other. A conductive bipolar plate 4 is interposed between adjacent unit cells to electrically connect the unit cells to each other.

The bipolar plate 4 may be formed, for example, of a graphite block having high mechanical strength, high electrical conductivity, and good workability. A block of a composite material containing a metal or a conductive polymer can also be used as the bipolar plate 4. Flow channel 41 and flow channel 42, which independently supply fuel and oxidant (typically, air) to an anode 2 and a cathode 3 contacting the bipolar plate 4 are formed on respective surfaces of the bipolar plate 4. In other words, the bipolar plate 4, when placed in the fuel stack, has one surface that faces an anode 2 of a unit cell and includes flow channel 41 and has an opposite surface that faces the cathode 3 of another unit cell and includes the flow channel 42. On an uppermost and a lowermost end of the fuel stack, end plates (not shown), which are monopolar plates that respectively supply fuel or air to the anode electrode 2 or the cathode electrode 3, are disposed. The end plates respectively include the flow channel 41 or the flow channel 42 (see FIG. 1) for supplying fuel or air to the contacting unit cells.

FIG. 2 is a plan view of a surface of a conventional bipolar plate 4 for a conventional PEMFC. In particular, FIG. 2 shows a surface where flow channels for a cathode are formed.

Referring to FIG. 2, in the conventional bipolar plate 4, a plurality of flow channels 42, of which upper parts thereof are opened, are formed in an electrode region 47 where a membrane electrode assembly (MEA) is disposed. Between the channels are lands 48 that contact the MEA. A region outside of the electrode region 47 includes manifolds 46 and 46' connected to an inlet or an outlet, respectively, of the flow channels 41 and fuel path holes 43a, 43b, 44a, and 44b that are through holes for supplying or discharging hydrogen fuel or oxidant by connecting to the manifolds 46 and 46' and that perforate the bipolar plate 4. The fuel path holes 43a, 43b, 44a, and 44b constitute an inlet 43a and an outlet 43b of the hydrogen fuel and an inlet 44a and an outlet 44b of the oxidant.

The flow channels 42 in FIG. 2 can be formed to have a simple structure in which the flow channels have the same cross-sectional area (same width and same depth). In the conventional bipolar plate 4 having the flow channels 42, the concentration of oxygen and hydrogen in a gas (air or a reformed hydrogen gas) that flows in the flow channels 42 is reduced as it flows. Accordingly, the current density of the fuel cell is not uniform, and reaction heat may be locally increased. Also, oxygen concentration (or hydrogen concentration at the anode electrode) at a portion of a vertical cross-section of the flow channels 42 that contacts the membrane 1 (see FIG. 1) is lower than the concentration of oxygen at a bottom portion of the flow channels 41, thereby reducing the efficiency of the fuel cell.

SUMMARY OF THE INVENTION

Aspects of the present invention provide a bipolar plate of a fuel cell, such as a direct liquid fuel cell, that maintains concentration uniformity of a fluid that flows in channels of the bipolar plate.

Aspects of the present invention also provide a fuel cell having the above bipolar plate.

According to an aspect of the present invention, there is provided a bipolar plate of a fuel cell, the bipolar plate having a fuel inlet, a fuel outlet and a plurality of flow channels for a fluid flow, wherein the flow channels are divided into multiple sections along a direction of the fuel flow, wherein the total cross-sectional area of the flow channels across the sections becomes smaller from the fluid inlet toward the fluid outlet and wherein a plurality of protrusions are formed between the sections, and the protrusions mix a fuel that passes through the flow channels.

The flow channels may be formed in approximately straight lines.

A total opening area of the flow channels of the sections may increase from the fuel inlet toward the fuel outlet.

The flow channels may be divided into two or three sections.

According to another aspect of the present invention, there is provided a fuel cell in which membrane electrode assemblies (MEAs) each having an anode and a cathode respectively provided on each surface of an electrolyte membrane are interposed between a plurality of bipolar plates, wherein each of the bipolar plates comprises a first surface having a hydrogen fuel inlet, a hydrogen fuel outlet and a plurality of flow channels that supply a hydrogen fuel to the anode of one of the MEAs and a second surface having an oxidant inlet, an oxidant outlet and a plurality of flow channels that supply an oxidant to the cathode of an adjacent one of the MEAs, wherein the flow channels that supply the hydrogen fuel or oxidant to at least one of the anode and the cathode are divided into a plurality of sections along a direction of hydrogen fuel or oxidant flow, wherein the total cross-sectional area of the flow channels across the sections becomes smaller from a hydrogen fuel or oxidant inlet toward a hydrogen fuel or oxidant outlet, and wherein a plurality of protrusions are formed between the sections, and the protrusions mix the hydrogen fuel or the oxidant that passes through the flow channels.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
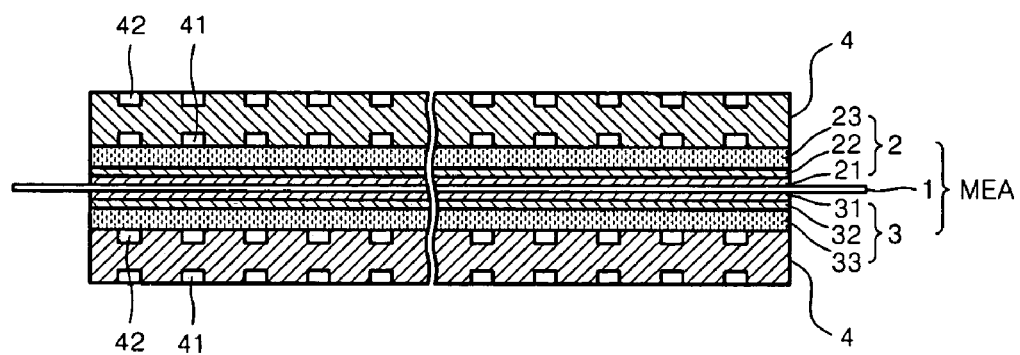
FIG. 1 is a cross-sectional view of a basic configuration of a direct liquid feed fuel cell.
Figure 2:
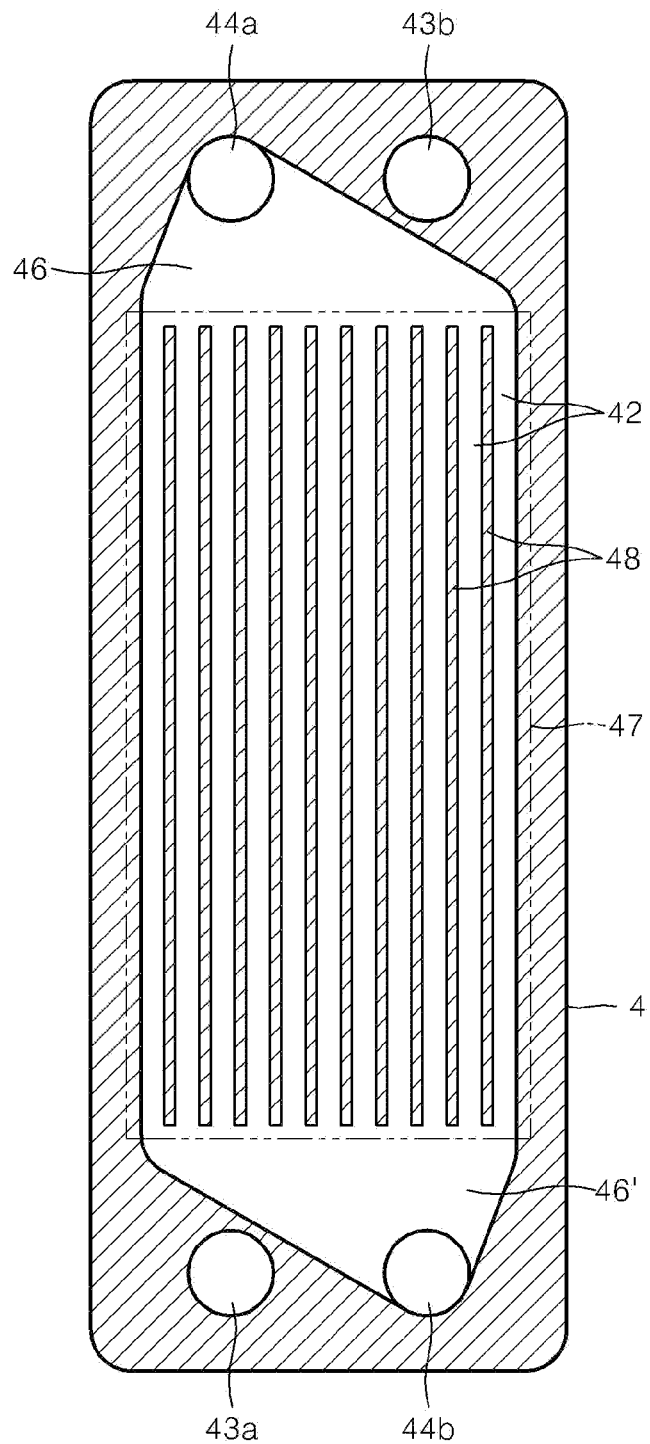
FIG. 2 is a plan view of a surface of a bipolar plate for a conventional PEMFC.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
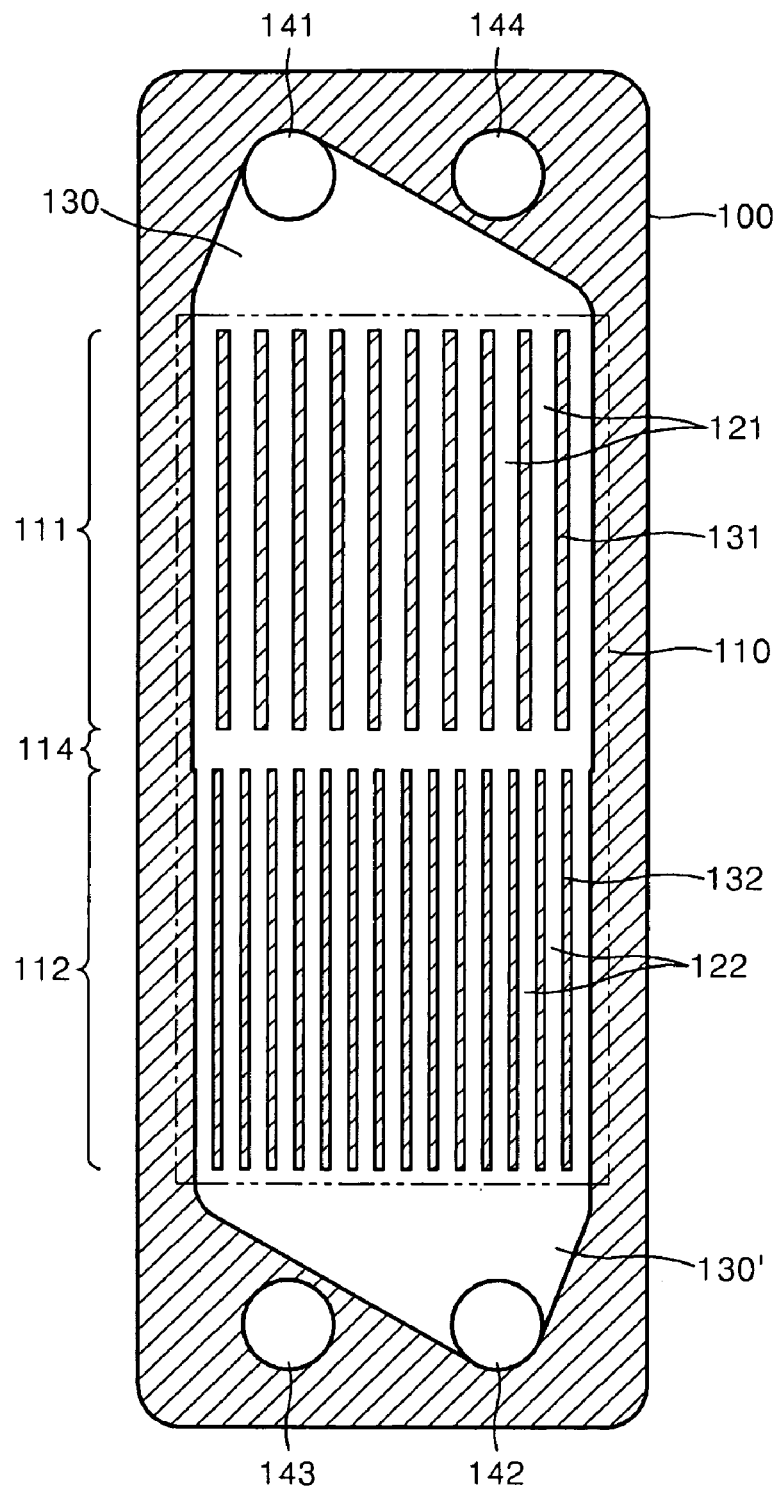
FIG. 3 is a plan view of a surface of a bipolar plate according to an embodiment of the present invention.

FIG. 3 is a plan view of a surface of a bipolar plate according to an embodiment of the present invention. As described herein, the surface is a surface that supplies an oxidant such as, for example, air and contacts a cathode side of a membrane electrode assembly (MEA). However, it is to be understood that the structural features of embodiments described herein may also be incorporated in a surface that supplies hydrogen fuel, such as a surface that contacts an anode side of an MEA.

As used herein, the term "fuel" may refer to either a hydrogen fuel or an oxidant. More generally, the term "fluid" refers to any liquid or gas that is directed to flow in a bipolar plate. The term "hydrogen fuel" refers to any fluid that is capable of reacting at an anode side of a fuel cell to produce hydrogen ions and may refer to, for example, hydrogen-containing gas, such as a hydrogen-rich gas, methanol, ethanol, reformed methanol or ethanol, etc. The term "oxidant" refers to any fluid that is capable of reacting at a cathode side of a fuel cell. For example, the oxidant may be oxygen that combines with hydrogen ions and electrons generated by the fuel cell to produce water. Specifically, the oxidant may be an oxygen-containing gas, such as air.

Referring to FIG. 3, oxidant flow channels 121 and 122 through which an oxidant (air) flows are formed on one surface of a bipolar plate 100, and fuel flow channels (not shown) through which a fuel flows are formed on the other surface of the bipolar plate 100. The oxidant flow channels 121 and 122 are formed in an electrode region 110 that contacts a membrane electrode assembly (MEA). The oxidant flow channels 121 and 122 are divided into a first section 111 and a second section 112, and a mixed space 114, in which the bipolar plate 100 does not contact the MEA, is formed between the first and second sections 111 and 112. Upper parts of the oxidant flow channels 121 and 122 and the mixed space 114 are opened, and lands 131 and 132 between the oxidant flow channels 121 and 122, respectively, contact the MEA.

Regions of the bipolar plate 100 outside of the electrode region 110 include a manifold 130 connected to an inlet of the first section 111 and a manifold 130' connected to an outlet of the second section 112 and fuel path holes 141 through 144 for supplying or discharging a fuel (air and hydrogen fuel) by connecting to the manifolds 130 and 130' and that perforate the bipolar plate 100. The fuel path holes 141 and 142 constitute an inlet 141 and an outlet 142 of the oxidant. Reference numerals 143 and 144 indicate hydrogen fuel path holes.

The oxidant flow channels 121 of the first section 111 have a different size from the oxidant flow channels 122 of the second section 112. Table 1 shows an exemplary design ratio of the oxidant flow channels 121 and 122 of the first and second sections 111 and 112.

TABLE 1

|  | First section | Second section |
| --- | --- | --- |
| Width | 1 | 0.8 |
| Depth | 0.7 | 0.5 |
| Length | 1 | 1 |
| Number of fuel channels | 2 | 3 |

Referring to Table 1, a cross-sectional area (width×depth×number of channels) of each of the oxidant flow channels 121 in the first section 111 is 1.4, but a cross-sectional area of each of the oxidant flow channels 122 in the second section 112 is 1.2. Accordingly, the flow rate in the second section 112 is higher than in the first section 111. Also, the ratio of total opening area (width×number of channels) (ratio of area that contacts the MEA) of the oxidant flow channels 121 in the first section 111 is 1, while the ratio of total opening area of the oxidant flow channels 121 in the second section 112 is 1.2. Accordingly, the ratio of the contact area with the MEA in the second section 112 is higher than in the first section 111. Therefore, this design increases the flow rate of air and the ratio of contact area with the MEA in the second section 112 to compensate for the lower oxygen concentration in the second section 112 than in the first section 111.

Figure 4:
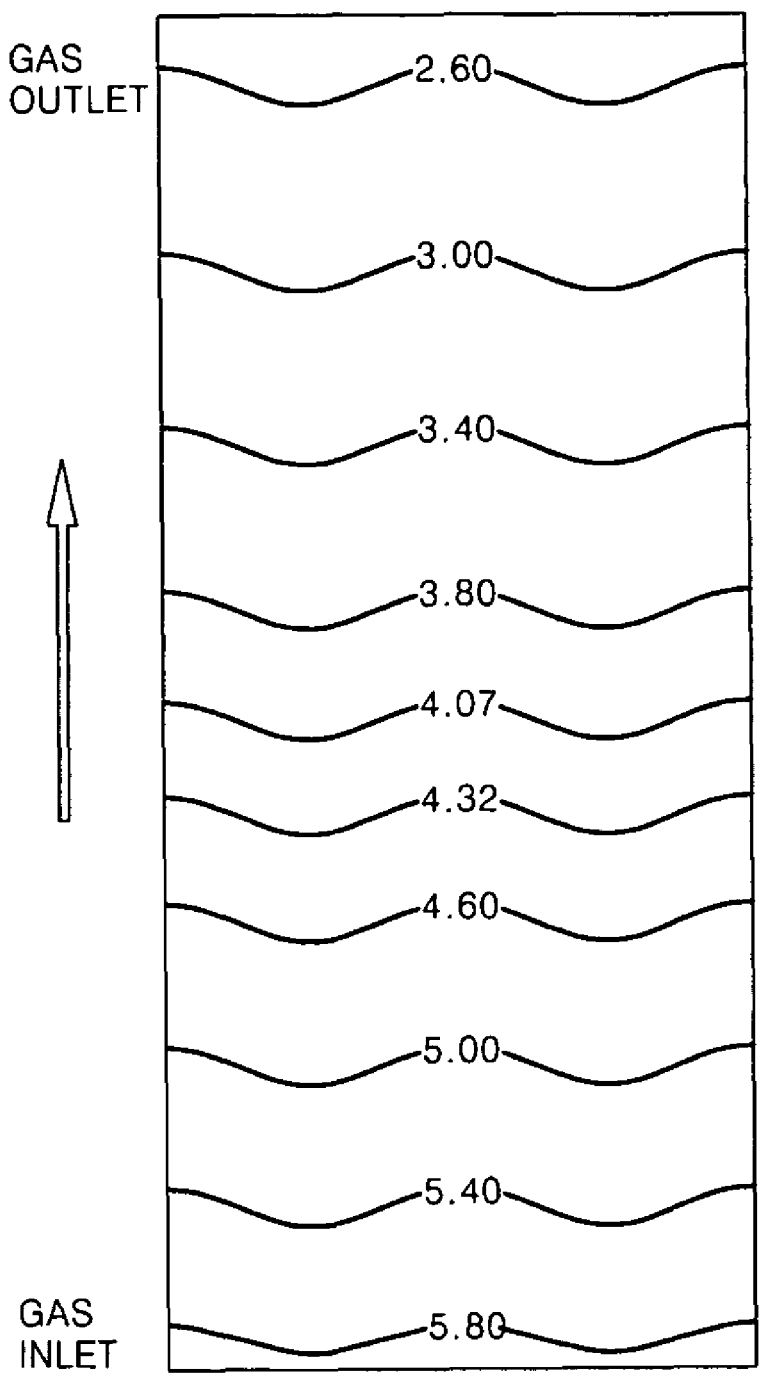
FIGS. 4 and 5 are graphs showing oxygen concentrations ($mol/m^3$) in air flow channels respectively in a conventional bipolar plate and a bipolar plate according to an embodiment of the present invention.
Figure 5:
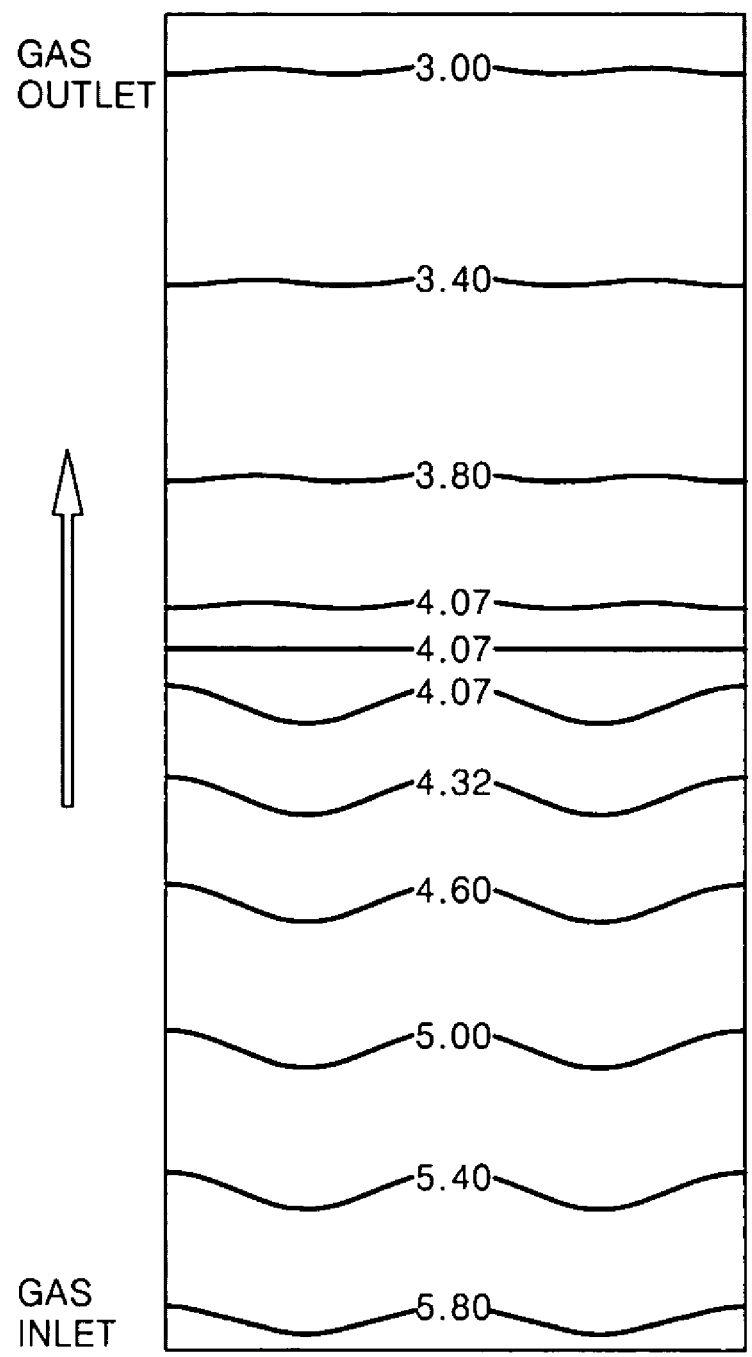

FIG. 4 is a graph showing oxygen concentrations ($mol/m^3$) in a conventional bipolar plate 4. FIG. 5 is a graph showing oxygen concentrations ($mol/m^3$) in the bipolar plate 100 having oxidant flow channels 121 and 122 according to an embodiment of the present invention.

Referring to FIGS. 4 and 5, the rate of oxygen concentration reduction in the first section 111 of the bipolar plate 100 according to the present embodiment is almost the same as in the corresponding portion of the conventional bipolar plate 4. However, in the second section 112, the rate of oxygen concentration reduction of the bipolar plate 100 according to the present embodiment is lower than in the conventional bipolar plate 4. This is due to the relatively shallow depth of the oxidant flow channels 122 in the second section 112, which eventually reduces the oxygen concentration difference at the vertical cross-section of the oxidant flow channels 122.

Table 2 summarizes the performances of a fuel cell having a conventional bipolar plate 4 and a fuel cell having the bipolar plate 100 according to an embodiment of the present embodiment.

TABLE 2

|  | Conventional art | Present embodiment |
|---|---|---|
| Average current density, A/cm$^2$ | 0.3367 | 0.3371 |
| Pressure loss (cathode), Pa | 189 | 268 |
| Pressure loss (anode), Pa | 85 | 85 |

Table 3 shows operating conditions of the fuel cells.

TABLE 3

| Mass flow rate (anode), kg/s | $4.0 \times 10^{-8}$ |
|---|---|
| Mass flow rate (cathode), kg/s | $2.0 \times 10^{-6}$ |
| Operating pressure, atm | 1.1 |
| Anode gas | $H_2 = 100\%$ |
| Cathode gas | $O_2:N_2 = 0.2:0.8$ |
| Cell voltage, V | 0.7 |

Referring to Tables 2 and 3, the fuel cell that uses the bipolar plate 100 according to the present embodiment has an increased average current density. The increased pressure loss in the oxidant flow channels 121 and 122 that contact the cathode is caused by the increased flow rate due to the reduction of the cross-sectional areas of the oxidant flow channels 122 in the second section 112. The increase in the flow rate and the contact area between the MEA and the uniformity of concentration at the vertical cross-sections of the oxidant flow channels 122 in the second section 112 help the supply of oxygen in the second section 112. As a result, favorable current characteristics are obtained. On the other hand, no difference in the pressure loss was observed at a surface of the bipolar plates that contacts the anode since identical flow channels at the surface facing the anode are formed in the conventional bipolar plate and in the bipolar plate 100 according to the present embodiment.

Figure 6:
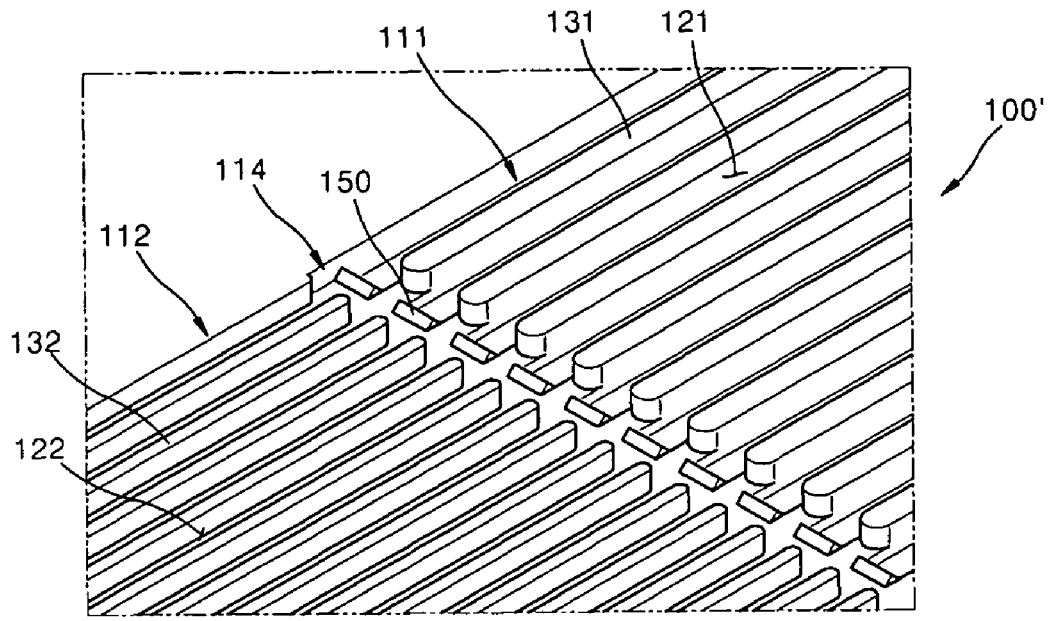
FIG. 6 is a partial perspective view of a bipolar plate according to another embodiment of the present invention.

FIG. 6 is a partial perspective view of a bipolar plate 100' according to another embodiment of the present invention. Like reference numerals are used for substantially identical elements in FIG. 3, and detailed descriptions thereof will not be repeated.

Referring to FIG. 6, obstacles 150, which are protrusion portions, are formed in a mixed space 114 between a first section 111 and a second section 112. The obstacles 150 are formed such that a fluid that passes through oxidant flow channels 121 in the first section 111 flows over the obstacles 150 to enter into the oxidant flow channels 122 in the second section 112. At this time, the fluid becomes mixed, and accordingly, a uniform fuel concentration can be achieved. The obstacles 150 may be formed facing the outlets of the oxidant flow channels 121.

Figure 7:
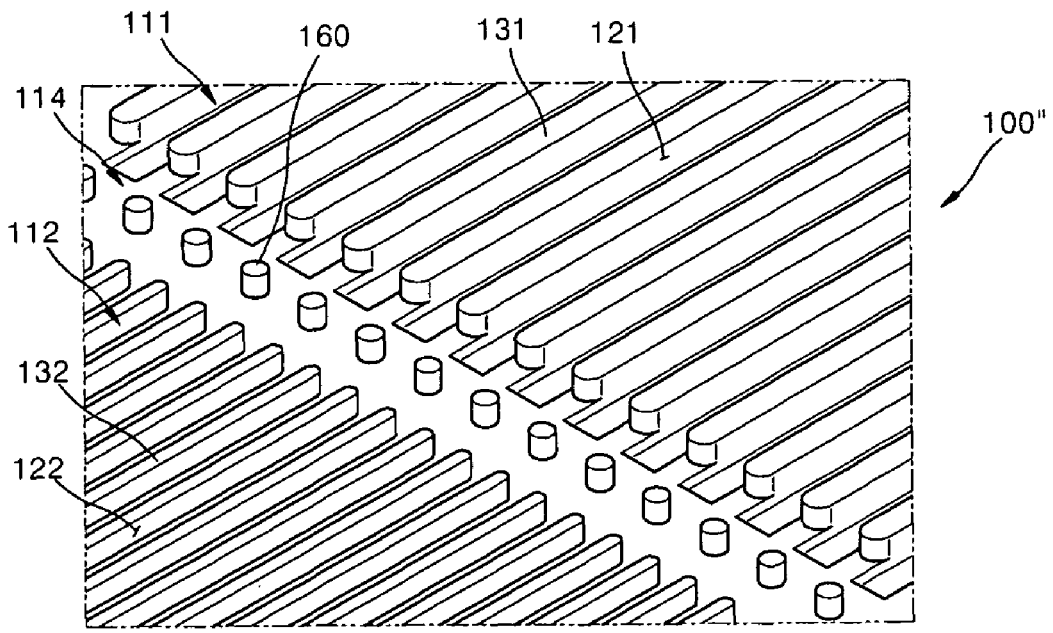
FIG. 7 is a partial perspective view of a bipolar plate according to another embodiment of the present invention.

FIG. 7 is a partial perspective view of a bipolar plate 100" according to another embodiment of the present invention. Like reference numerals are used for substantially identical elements in FIG. 3, and detailed descriptions thereof will not be repeated.

Referring to FIG. 7, disturbers 160, which are protrusions, are formed in a mixed space 114 between a first section 111 and a second section 112. The disturbers 160 may have a cylindrical shape. The disturbers 160 are formed such that a fluid that passes through oxidant flow channels 121 in the first section 111 flows around the disturbers 160 to enter into oxidant flow channels 122 in the second section 112. At this time, the fluid becomes mixed, and accordingly, a uniform fuel concentration can be achieved.

Table 4 summarizes the performances of the fuel cells respectively having a conventional bipolar plate 4 and the bipolar plates 100' (embodiment 1) and 100" (embodiment 2) according to the present embodiments. The same operating conditions indicated in Table 3 were applied.

TABLE 4

|  | Conventional art | Embodiment 1 | Embodiment 2 |
|---|---|---|---|
| Average current density, A/cm$^2$ | 0.3367 | 0.3373 | 0.3419 |
| Pressure loss (cathode), Pa | 189 | 275 | 303 |
| Pressure loss (anode), Pa | 85 | 82 | 76 |

Referring to Table 4, the fuel cells that use the bipolar plates 100' and 100" according to the embodiments of the present invention have higher average current densities than a fuel cell that uses the conventional bipolar plate 4. In particular, the fuel cell that uses the bipolar plate 100" having the disturbers 160 shows a large increase in the current density. The increased pressure loss in the oxidant flow channels 121 and 122 that contact the cathode is caused by the reduction of the cross-sectional areas of the oxidant flow channels 122 across the second section 112 and the protrusions 150 and 160, thereby increasing the flow rate in the second section 112. The increase in the flow rate and the contact area between the MEA and the uniformity of concentration at the vertical cross-sections of the oxidant flow channels 122 in the second section 112 help the supply of oxygen to the cathode in the second section 112. As a result, favorable current characteristics are obtained.

Figure 8:
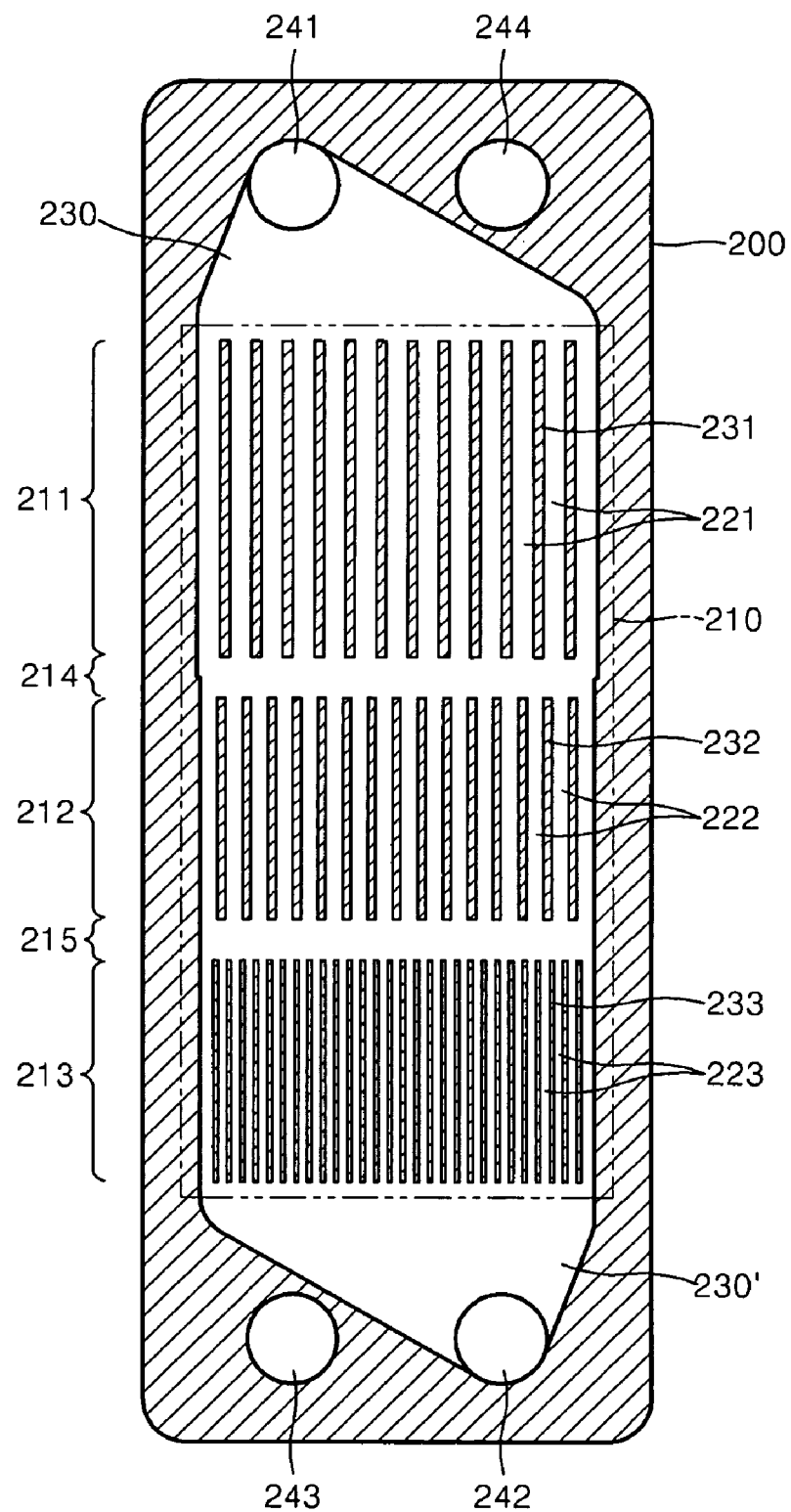
FIG. 8 is a plan view of a surface of a bipolar plate, for example, a surface where air is supplied, according to another embodiment of the present invention.

FIG. 8 is a plan view of a surface of a bipolar plate 200, for example, a surface where air is supplied, according to another embodiment of the present invention.

Referring to FIG. 8, oxidant flow channels 221, 222, and 223 are formed on a surface of the bipolar plate 200, and fuel flow channels (not shown) are formed on the other surface of the bipolar plate 200. The oxidant flow channels 221, 222, and 223 are formed in an electrode region 210 that contacts the MEA. The electrode region 210 is divided into first, second, and third sections 211, 212, and 213. Mixed spaces 214 and 215 that do not contact the MEA are respectively formed between the first section 211 and the second section 212 and between the second section 212 and the third section 213. Upper parts of the oxidant flow channels 221, 222, and 223 and the mixed spaces 214 and 215 are opened to function as flow channels, and lands 231, 232 and 233 between the oxidant flow channels 221, 222 and 223, respectively, contact the MEA. Disturbers 160 (see FIG. 7) may be formed in the mixed spaces 214 and 215.

Regions outside of the electrode region 210 include a manifold 230 that is connected to an inlet of the first section 211 and a manifold 230' connected to an outlet of the third section 213 and fuel path holes 241 through 244 for supplying or discharging a fuel (air and hydrogen fuel) by connecting to the manifolds 230 and 230' and that perforate the bipolar plate 200. The fuel path holes 241 and 242 constitute an inlet 241 and an outlet 242 of the oxidant. Reference numerals 243 and 244 respectively indicate hydrogen fuel path holes.

Table 5 shows a design ratio of the oxidant flow channels 221, 222, and 223 of the first through third sections 211, 212, and 213.

TABLE 5

|  | First section | Second section | Third section |
| --- | --- | --- | --- |
| Width | 1 | 0.7 | 0.6 |
| Depth | 0.7 | 0.6 | 0.5 |
| Length | 0.4 | 0.3 | 0.3 |
| Number of channels | 2 | 3 | 4 |

Referring to Table 5, cross-sectional areas of the oxidant flow channels 221, 222, and 223 in the first through third sections 211, 212, and 213 are respectively 1.4, 1.32, and 1.2. Accordingly, the flow rate of the fluid increases as it goes to the third section 213 from the first section 211.

Also, the ratio of the total opening area (width×number of channels) (ratio of area that contacts the MEA) of the oxidant flow channels 221, 222, and 223 in the first through third sections 211, 212, and 213 is 2:2.1:2.4. The ratio of contact area with the MEA in the second section 212 and the third section 213 is higher than in the first section 211. The design increases the flow rate of air and the ratio of contact area with the MEA in the second section 212 and the third section 213 to compensate for the fact that the second section 212 and the third section 213 have a lower oxygen concentration than the first section 211.

Table 6 summarizes the performances of a fuel cell having the bipolar plate 200 according to the present embodiment. The same operating conditions indicated in Table 3 were applied.

TABLE 6

|  | Conventional art | Present embodiment |
| --- | --- | --- |
| Average current density, A/cm$^2$ | 0.3367 | 0.3488 |
| Pressure loss (cathode), Pa | 189 | 453 |
| Pressure loss (anode), Pa | 85 | 76 |

Referring to Table 6, the fuel cell that uses the bipolar plate 200 according to the current embodiment of the present invention has a higher average current density than a fuel cell that uses the conventional bipolar plate 4. The increased pressure loss in the oxidant flow channels 221, 222, and 223 that contact the cathode is caused by the reduction of cross-sectional area in the second section 212 and the third section 213, and accordingly, the flow rate of air in the second section 212 and the third section 213 is increased. The increase in the flow rate of air and the contact area between the MEA and the uniformity of concentration at the vertical cross-sections of the oxidant flow channels 222 and 223 in the second section 212 and the third section 213 help the supply of oxygen in the second section 212 and the third section 213. As a result, favorable current characteristics are obtained. On the other hand, no substantial difference in pressure loss was observed at surfaces of the bipolar plates that contact an anode since identical flow channels are formed at the surface facing the anode in the conventional bipolar plate and in the bipolar plate 200 according to the present embodiment.

Figure 9:
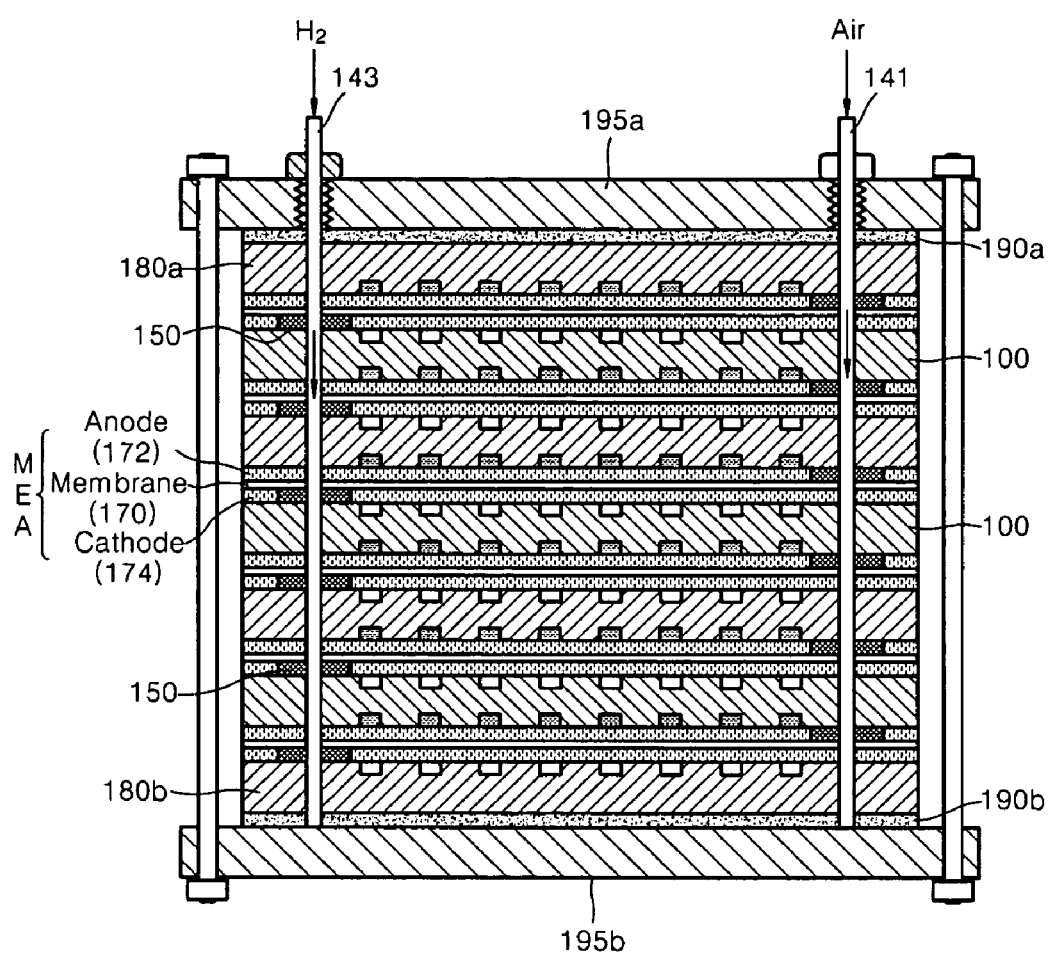
FIG. 9 is a cross-sectional view of a direct liquid feed fuel cell having the bipolar plate of FIG. 3, according to an embodiment the present invention.

FIG. 9 is a cross-sectional view of a direct liquid feed fuel cell having the bipolar plate 100, illustrated in FIG. 3, according to an embodiment of the present invention. Like reference numerals are used for substantially identical elements in FIG. 3, and detailed descriptions thereof will not be repeated. Although FIG. 9 shows the bipolar plate 100, it is to be understood that the bipolar plates 100' (FIG. 6), 100" ((FIG. 7), or 200 (FIG. 8) may also be used in a direct liquid feed fuel cell. Although FIG. 9 shows a direct liquid feed fuel, it is to be understood that the present invention is not limited to direct liquid fuel cells and that the bipolar plate according to the aspects of the present invention may be used in any type of proton exchange membrane fuel cell, or more generally, in any type of fuel cell that includes bipolar plates placed between MEAs.

Referring to FIG. 9, a plurality of MEAs are stacked in a fuel cell stack, and conductive bipolar plates 100 are placed between the MEAs. Each MEA has an electrolyte membrane 170 having an anode 172 on a surface thereof and a cathode 174 on an opposite surface thereof. Conductive end plates 180a and 180b constitute uppermost and lowermost layers of the fuel cell stack, respectively. Only one surface of the conductive end plates 180a and 180b contacts an MEA, and thus the contacting surface of the conductive end plates 180a and 180b has the same shape as a surface of the bipolar plate 100 and functions in the same manner as the bipolar plate 100. The MEA, the bipolar plates 100 between the MEAs, the conductive end plates 180a and 180b, and current collection plates 190a and 190b can be fixed using both fixing end plates 195a and 195b by screw.

Reference numeral 150 indicates a sealing member, such as, for example, a gasket, and prevents a hydrogen fuel or an oxidant (air) supplied from the fuel path holes 141 through 144 from connecting to the anode 172 or the cathode 174.

As described above, a bipolar plate according to an embodiment of the present invention increases flow rate of air in a section where an oxygen concentration is reduced, reduces a vertical height of flow channels, and increases a supply of oxygen to an MEA by increasing a total width of the flow channels.

In a PEMFC stack according to an embodiment of the present invention, a fuel can be easily supplied by mounting the bipolar plate, thereby increasing current density.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A bipolar plate of a fuel cell, the bipolar plate having a fluid inlet, a fluid outlet and a plurality of flow channels for a fluid flow between the fluid inlet and the fluid outlet,
   wherein the flow channels are divided into multiple sections along a direction of the fluid flow and wherein a mixing space is located between adjacent sections of the flow channels,
   wherein a total cross-sectional area of the flow channels across the sections becomes smaller from the fluid inlet toward the fluid outlet and
   wherein a plurality of protrusions are formed in the mixing space between adjacent sections, and the protrusions mix a fluid that passes through the flow channels.

2. The bipolar plate of claim 1, wherein the flow channels are formed in approximately straight lines.

3. The bipolar plate of claim 1, wherein a total width of the flow channels across the sections, as measured where the flow channels contact a membrane electrode assembly, increases from the fuel inlet toward the fuel outlet.

4. The bipolar plate of claim 1, wherein the flow channels are divided into two or three sections.

5. The bipolar plate of claim 1, wherein the number of flow channels increases in sections toward the fuel outlet.

6. The bipolar plate of claim 1, wherein the plurality of protrusions are obstacles over which the fluid passes.

7. The bipolar plate of claim 1, wherein the plurality of protrusions are cylindrical-shaped protrusions around which the fluid passes.

8. A fuel cell in which membrane electrode assemblies (MEAs) each having an anode and a cathode respectively provided on each surface of an electrolyte membrane are interposed between a plurality of bipolar plates, wherein
   each of the bipolar plates comprises a first surface having a hydrogen fuel inlet, a hydrogen fuel outlet and a plurality of flow channels that supply a hydrogen fuel to the anode of one of the MEAs and a second surface having an oxidant inlet, an oxidant outlet and a plurality of flow channels that supply an oxidant to the cathode of an adjacent one of the MEAs,
   wherein the flow channels that supply the hydrogen fuel or oxidant to at least one of the anode and the cathode are divided into a plurality of sections along a direction of hydrogen fuel or oxidant flow,
   wherein a mixing space is located between adjacent sections of the flow channels,
   wherein the total cross-sectional area of the flow channels across the sections becomes smaller from a hydrogen fuel or oxidant inlet toward a hydrogen fuel or oxidant outlet, and
   wherein a plurality of protrusions are formed in the mixing space between adjacent sections, and the protrusions mix the hydrogen fuel or the oxidant that passes through the flow channels.

9. The fuel cell of claim 8, wherein the fuel cell is a direct liquid feed fuel cell.

10. The fuel cell of claim 8, wherein the flow channels are formed in approximately straight lines.

11. The fuel cell of claim 8, wherein a total width of the flow channels across the sections, as measured where the flow channels contact a membrane electrode assembly, increases from the fuel inlet toward the fuel outlet.

12. The fuel cell of claim 8, wherein the flow channels are divided into two or three sections.

13. The fuel cell of claim 8, wherein the flow channels that supply hydrogen fuel to the anode are divided into the plurality of sections.

14. The fuel cell of claim 8, wherein the flow channels that supply the oxidant to the cathode are divided into the plurality of sections.

15. The fuel cell of claim 8, wherein the flow channels that supply hydrogen fuel to the anode are divided into a plurality of sections and the flow channels that supply the oxidant to the cathode are divided into a plurality of sections.

16. The fuel cell of claim 8, wherein the fuel cell includes first conductive monopolar end plate having a surface that contacts a cathode of a membrane electrode assembly (MEA) at a first end of the fuel cell,
   wherein the surface contacting the cathode has an oxidant inlet, an oxidant outlet and a plurality of flow channels that supply an oxidant to the cathode of the MEA,
   wherein the flow channels that supply the oxidant to the cathode are divided into a plurality of sections along a direction of oxidant flow, wherein a mixing space is located between adjacent sections of the flow channels, wherein the total cross-sectional area of the flow channels across the sections becomes smaller from a oxidant inlet toward a oxidant outlet, and
   wherein a plurality of protrusions are formed in the mixing space between adjacent sections, and the protrusions mix the oxidant that passes through the flow channels.

17. The fuel cell of claim 8, wherein the fuel cell includes second conductive monopolar end plate having a surface that contacts an anode of a membrane electrode assembly (MEA) at a second end of the fuel cell,
   wherein the surface contacting the anode has an hydrogen fuel inlet, an hydrogen fuel outlet and a plurality of flow channels that supply a hydrogen fuel to the anode of the MEA,
   wherein the flow channels that supply the hydrogen fuel to the anode are divided into a plurality of sections along a direction of hydrogen fuel flow, wherein a mixing space is located between adjacent sections of the flow channels, wherein a total cross-sectional area of the flow channels across the sections becomes smaller from a hydrogen fuel inlet toward a hydrogen fuel outlet, and
   wherein a plurality of protrusions are formed in the mixing space between adjacent sections, and the protrusions mix the hydrogen fuel that passes through the flow channels.

* * * * *